April 25, 1950 R. T. TOWNSEND Re. 23,222

SKINNING MACHINE

Original Filed Nov. 8, 1944 2 Sheets-Sheet 1

INVENTOR.
Ray T. Townsend
BY Bair & Freeman
Att'ys.

SKINNING MACHINE
Original Filed Nov. 8, 1944 2 Sheets-Sheet 2
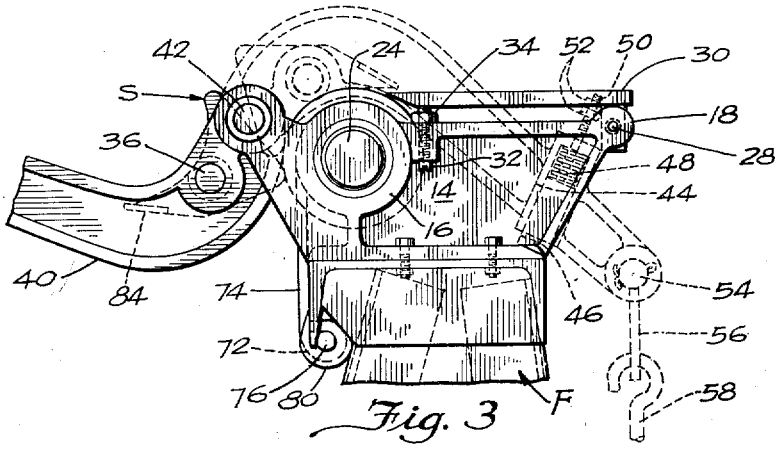
Fig. 3
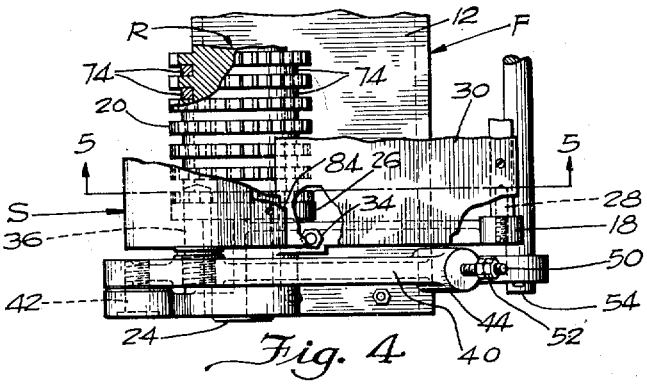
Fig. 4
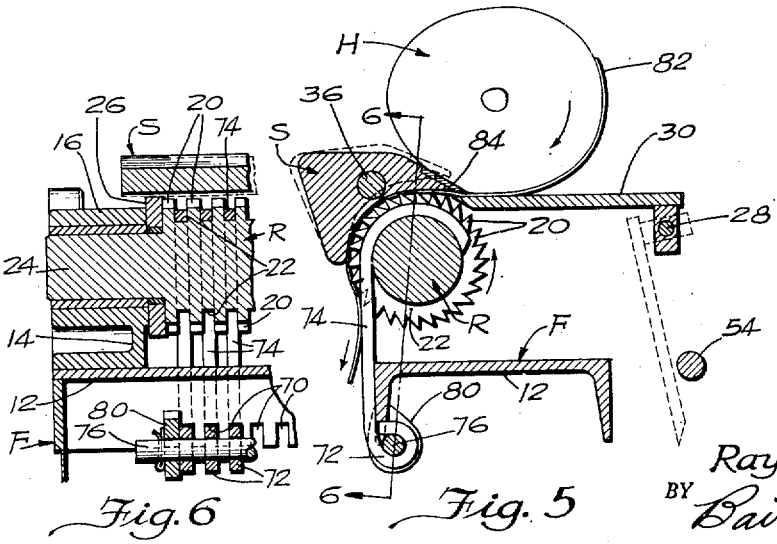
Fig. 6
Fig. 5
INVENTOR.
Ray T. Townsend
BY Bair & Freeman
Att'ys.

Reissued Apr. 25, 1950

Re. 23,222

UNITED STATES PATENT OFFICE 23,222

SKINNING MACHINE

Ray T. Townsend, Des Moines, Iowa, assignor to Townsend Engineering Company, Des Moines, Iowa, a corporation of Iowa Original No. 2,455,831, dated December 7, 1948, Serial No. 562,460, November 8, 1944. Application for reissue December 27, 1948, Serial No. 67,442

21 Claims. (Cl. 146—130)

Matter enclosed in heavy brackets [ ] appears in the original patent but forms no part of this reissue specification; matter printed in italics indicates the additions made by reissue

My present invention relates to a skinning machine which is particularly adapted for skinning hams, shoulders, jowls, and the like in a quick and efficient manner.

One object of this invention is to provide a machine of this character which is comparatively simple and inexpensive from a manufacturing standpoint.

Another object is to provide a skinning machine wherein a skin pulling roller and a pressure shoe cooperate with each other to remove the skin from a ham or the like, the coaction of the two resulting in a very effective grip on the skin to insure the removal thereof from the ham in a minimum of time with a maximum of convenience.

Still another object is to provide a stripping means in the form of rods received in peripheral grooves of the roller between serrations on its surface to form an effective stripping means without interfering with the gripping of a skin between the roller and the shoe.

A further object is to provide a machine of this character which is readily driven by power such as an electric motor or the like and which reduces the manual operations necessary to loosening one corner of the skin and then holding the ham in the proper relation to the serrated roller and the pressure shoe, permitting the ham to roll during the skinning action until the skin is completely removed from the circumference of the ham.

Still a further object is to provide an arrangement of parts which facilitates cleaning the machine, and, particularly, the mounting of the pressure shoe and feed table so that they can be swung away from the skin pulling roller and the pressure shoe inverted so that all the parts can be reached readily for cleaning with a brush or hose and the roller thus left exposed for cleaning, the stripper rods being mounted on a pin which can be withdrawn to permit the removal of all the stripper rods for separate cleaning and to facilitate access to the grooves in the roller for cleaning them.

With these and other objects in view, my invention consists in the construction, arrangement and combination of the various parts of my skinning machine whereby the objects contemplated are attained, as hereinafter more fully set forth, pointed out in my claims and illustrated in the accompanying drawings, wherein:

Fig. 3 is an enlarged end view showing the pressure shoe opened for cleaning;

Fig. 4 is a partial plan view of the machine;

Fig. 5 is a sectional view on the line 5—5 of Fig. 4; and

Fig. 6 is a sectional view on the line 6—6 of Fig. 5.

Figure 1:
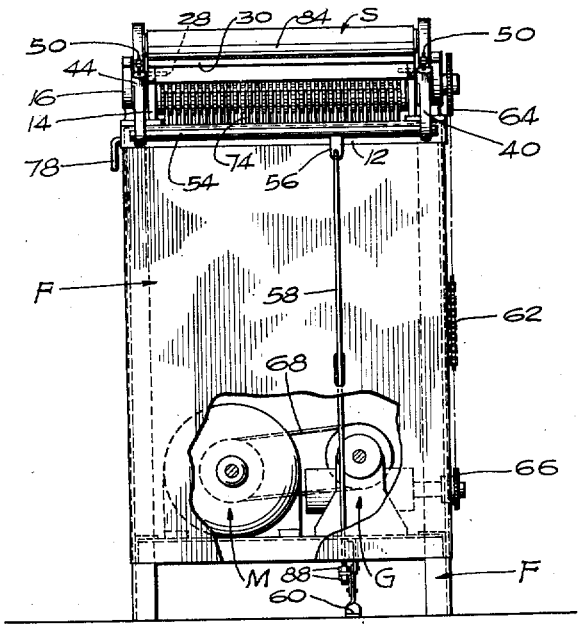
Fig. 1 is a front elevation of a skinning machine embodying my invention with portions thereof broken away to show constructional details.

On the accompanying drawing I have used the reference character F to indicate, in general, a frame which may be supported as on a floor surface 10. The frame F includes a channel-shaped top plate 12 on which is mounted a pair of end plates 14. The end plates 14 have bearings 16 and 18. Journaled in the bearings 16 is a roller R provided with spaced circular rows of teeth 20 having grooves 22 between the teeth. The ends of the roller are shown in Fig. 6 having spindles 24 journaled in the bearings 16. The bearings 16 may be suitably bushed or provided with ball or roller type bearings if desired. Between each end groove 22 and the bearings 16 I provide a limiting ring 26 which may also be bushed for rotation on the spindles 24.

A shaft 28 is mounted in the bearings 18 and pivotally supports a feed plate 30. The feed plate 30, as shown in Fig. 3, has its end adjacent the roller R beveled and adjustable in height by an adjusting screw 32 in each end plate 14. Lock nuts 34 are provided to retain the adjustment.

A pressure shoe S is provided which has the cross-sectional shape shown in Fig. 5, and which is pivoted on a shaft 36. The shaft 36 is carried by bearings 38 of a pair of arms 40, which arms, in turn, are pivoted at 42 to the side frame 14.

Each arm 40 has a spring housing 44 in which is mounted a plunger 46 and a spring 48, with the spring tending to push the plunger downwardly in the spring housing. To limit the downward movement a stem 50 is provided on the plunger and lock nuts 52 are threaded on the stem so that adjustment can be had and retained.

The free ends of the arms 40 are connected together by shaft 54, which has an eye-plate 56 depending therefrom into which a control rod 58 is hooked. The lower end of the control rod is pivoted to a foot pedal 60 for manual control of the arms, as will hereinafter appear.

The skin pulling roller R is rotated in any suitable manner, as by a chain drive 62 extending around a large sprocket 64 on one of the spindles 24 of the roller R and a small sprocket 66 on a gear reducer G. The gear reducer G is belted, as by a belt 68, to a motor M of electric or any suitable type.

The front flange of the top channel 12 of the frame F has a plurality of notches 70 therein to partially receive eyes 72 of stripper rods 74. The eyes 72 receive a pin 76 having a handle 78 at one end and passing through a pair of perforated ears 80 secured to the channel 12 adjacent the ends of the channel. The stripper rods 74, it will be noted, are received in the grooves 22 and extend partially around the roller R (see Fig. 5). The pin 76 may be withdrawn for permitting the stripper rods 74 to be removed from the roller R for cleaning purposes, as will hereinafter appear.

Practical operation

In the operation of my skinning machine a ham, shoulder or jowl indicated at H in Fig. 5, having skin 82 thereon, is first prepared for stripping the skin therefrom by using a knife to loosen one corner of the skin. The spring plungers 46 normally keep the arms 40 elevated to the solid line position shown in Fig. 2, which permits the shoe S to assume the dotted position shown in Fig. 5. The shoe is concave to partially follow the roller R and thereby effect a good grip of the teeth of the roller with relation to the skin 82. The shoe S has a reduced leading edge which may be formed by a removable blade 84 having a square corner at its lower right edge in Fig. 5, as distinguished from a knife edge, since the purpose is to strip the skin from the ham without cutting it, and the edge being formed at substantially 90 degrees effects a good fleshing action on the skin.

The loose corner of the skin is inserted under the shoe S and the pedals 60 depressed for moving the shoe to the solid line position shown in Fig. 5 so that the teeth of the roller R grip the skin and progressively skin it from the ham H, rotating the ham clockwise in Fig. 5 at the same time. The skin drops onto a deflector 86 which may deflect it into a conveyor, truck or the like for disposing of the skins. The skinning operation will continue until the entire ham is skinned, whereupon the pedal 60 may be released preparatory to skinning another ham. During the skinning operation the skin is stripped from the teeth of the roller R by the stripper rods 74 in a very effective manner.

Figure 2:
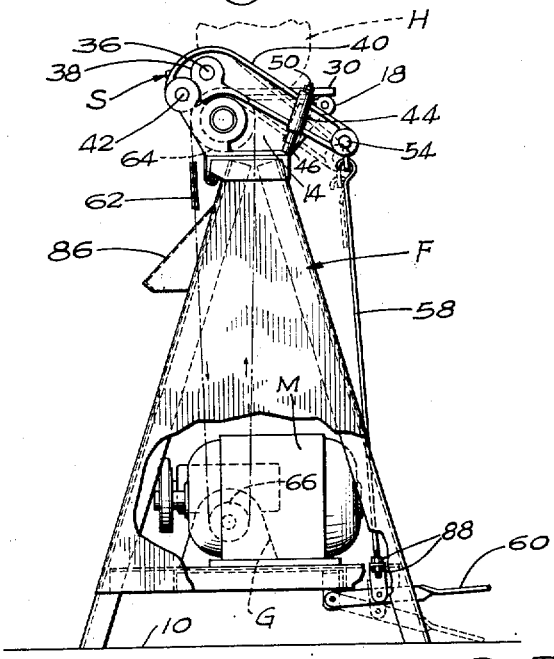
Fig. 2 is an end elevation, also with portions broken away.

Depending upon the amount of fat to be left on the skin and/or the thickness of the skin, the rod 58 may be adjusted, as by a pair of nuts 88 at its lower end in Fig. 2 so that when the pedal 60 is depressed fully the shoe may be relatively close to the teeth 20, as shown in Fig. 5, or spaced farther therefrom. If the adjustment of the rod 58 is too short the shoe would tend to strike the teeth 20 if it were not for the limiting rings 26. These, as shown in Fig. 6, are slightly higher than the teeth so that the shoe will strike them first, and the rollers will then remain stationary while the skin pulling roller R will continue to move, but without its teeth striking the shoe. Likewise, the ends of the feed plate 30 will engage the limiting rings 26 before striking the teeth if the adjustment 32 is too low.

With a machine of the character disclosed the skinning operation is comparatively simple and can be performed quickly in an efficient manner. The skin issuing from the machine, of course, is punctuated with indentations of the teeth 20, but, ordinarily, the skins of hams and shoulders are not needed for any useful purpose where such indentations are objectionable.

Another important consideration in a machine of this kind is ease of cleaning. With my arrangement the shoe S can be inverted as to the position shown by solid lines in Fig. 3 by unhooking the rod 58 from the eye-plate 56 and swinging the arms 40 through a movement of about one half circle. This position of the shoe also permits ready access to the roller R for cleaning it, and the feed table 30 may be swung around to the position shown by dotted lines in Fig. 5 for facilitating the cleaning of the roller.

The pin 76 may be completely withdrawn so that all of the stripper rods 74 are free to be unhooked from the roller R and separately cleaned, and this operation also permits of ready access to the grooves 22 for cleaning them. Thus the machine can be kept in a sanitary condition without inconvenience in getting at parts which are hard to clean when assembled in their normal operating relation to each other.

Some changes may be made in the arrangement and construction of the various parts of my skinning machine, without departing from the real spirit and purpose of my invention, and it is my intention to cover by my claims any modified forms of structure or use of mechanical equivalents which may be reasonably included within their scope.

I claim as my invention:

1. In a skinning machine, a frame, a serrated roller journaled thereon, a curved pressure shoe partially surrounding said roller and *forming a skin pulling means therewith, said pressure shoe* having a reduced leading edge for parting the skin from an object, a feed table for the object to feed the skin to the space between the serrations of said roller and said pressure shoe, *means for urging said pressure shoe and said roller toward each other and affording movement of said pressure shoe and roller apart from each other to automatically vary the space therebetween during the skinning operation* said roller having peripheral grooves between the serrations thereof, and stripping means received in said grooves and partially surrounding said roller to strip the skin fom the serrations thereof.

[2. In a skinning machine, a frame, a toothed roller journaled thereon, a curved pressure shoe partially surrounding said roller and having a reduced leading edge for parting the skin from an object, a table for the object to feed the skin to the space between the teeth of said roller and said pressure shoe, said roller having peripheral grooves between the serrations thereof and stripping means received in said grooves and partially surrounding said roller to strip the skin from the teeth of the roller, said table being adjustable on said frame toward and away from said roller.]

3. A skinning machine comprising a frame, a toothed skin pulling roller journaled thereon, a concave pressure shoe adjacent said roller and having a reduced leading edge for parting the skin from an object, pivoted arm means for carrying said shoe, spring means normally spacing said shoe from said roller, manually controllable means for swinging said arms to bring said shoe into close relationship to said roller, said arms being swingable to a position for spacing said shoe from said roller and inverting it for cleaning purposes, and a table for supporting an object in position for feeding of the skin of the object to the space between said roller and said pressure shoe.

4. In a skinning machine, a frame, a toothed roller journaled thereon, a pressure shoe adjacent said roller for parting the skin from an object, a feed table for supporting the object in position for feeding of the skin thereof to the space between said roller and said pressure shoe, stripping means to strip the skin from said roller comprising stripper rods received in grooves of said roller and partially surrounding the same, said rods having eyes, and a removable pin through said eyes to normally retain the stripper rods in operative position and to permit their removal for cleaning purposes when the pin is withdrawn.

5. In a skinning machine, a frame, a toothed roller journaled thereon and having spaced grooves, stripper rods in said grooves, limiting rings of a greater diameter than said roller journaled on the ends of said roller, a pressure shoe adjacent said roller and having a reduced leading edge for parting the skin from an object, said pressure shoe being adjustable toward and away from said roller, a feed table adjustable toward and away from said roller for feeding the skin of the object to the space between said roller and said pressure shoe, said limiting rings being contactable by said shoe and feed table to prevent contact thereof with the teeth of said roller, said stripping means and shoe being capable of spacing from said roller to permit cleaning of the machine.

6. In a skinning machine, a frame, a toothed roller journaled thereon, limiting rings of a greater diameter than said roller journaled on the ends of said roller, a pressure shoe adjacent said roller for parting the skin from an object, said pressure shoe being adjustable toward and away from said roller, a feed table adjustable toward and away from said roller for feeding the skin of the object to the space between said roller and said shoe, said limiting rings being contactable by said shoe and feed table to prevent contact thereof with the teeth of said roller.

7. A skinning machine comprising a frame, a toothed roller journaled thereon, arms pivoted to said frame, spring hold-up means for said arms and manual depressing means therefor, a pressure shoe carried by said arms adjacent said roller and having a reduced leading edge for parting the skin from an object, a table for supporting the object in position for feeding of the skin thereof to the space between said roller and said pressure shoe, and means to unhook said depresser pedal with relation to said arms and permit them to swing said shoe to a cleaning position spaced from said roller.

8. A skinning machine comprising a frame, a toothed roller journaled thereon, pivoted arms, spring hold-up means for said arms and manual depressing means therefor, a pressure shoe carried by said arms adjacent said roller and having a leading edge for parting the skin from an object, and means to unhook said depresser pedal with relation to said arms and permit them to swing said shoe to an inverted cleaning position spaced from said roller to permit access thereto.

9. A skinning machine comprising a frame, a toothed roller journaled thereon, pivoted arms, a pressure shoe carried by said arms adjacent said roller and having a leading edge for parting the skin from an object, removable stripping means for said roller, a depressor pedal for said arms, and means to unhook said depressor pedal with relation to said arms and permit them to swing said shoe to an inverted cleaning position spaced from said roller to permit access thereto and to permit removal of said stripping means from said roller.

10. A skinning machine comprising a frame, a toothed skin pulling roller journaled thereon, a concave pressure shoe adjacent said roller, the concave surface of said pressure shoe partially surrounding said roller and cooperable therewith for forming a skin pulling means, said pressure shoe having a reduced leading edge formed thereon and carried thereby for parting the skin from an object, pivoted arm means for carrying said shoe, spring means normally spacing said shoe from said roller, means for swinging said arms to bring said shoe into close relationship to said roller, means for limiting the extent of movement of said arms and shoe toward said roller and for thereby maintaining said reduced leading edge of said shoe out of contact with said roller at all times, and a table for supporting an object in position for feeding of the skin of the object to the space between said roller and said pressure shoe.

11. A skinning machine comprising a frame, a toothed roller journaled thereon, a pressure shoe adjacent said roller and movable into and out of operative position with respect to said roller, said pressure shoe when in said operative position partially surrounding said roller and forming a skin pulling means therewith, said pressure shoe having a reduced leading edge for parting the skin from an object, biasing means urging said pressure shoe out of said operative position, manual means for moving said pressure shoe into said operative position against said biasing means and holding it in said operative position, means fixed with respect to said frame for limiting the extent of movement of said pressure shoe into operative position and for thereby maintaining said reduced leading edge out of contact with said roller at all times, a table for supporting an object in position for feeding of the skin of the object to the space between said roller and said pressure shoe, and stripping means to strip the skin from said roller.

12. A skinning machine comprising a frame, a toothed roller journaled thereon, a pressure shoe adjacent said roller and movable into and out of operative position with respect to said roller, said pressure shoe when in said operative position partially surrounding said roller and forming a skin pulling means therewith, said pressure shoe having a reduced leading edge for parting the skin from an object, biasing means urging said pressure shoe out of said operative position, manual means for moving said pressure shoe into said operative position against said biasing means and holding it in said operative position, means fixed with respect to said frame for limiting the extent of movement of said pressure shoe into operative position and for thereby maintaining said reduced leading edge out of contact with said roller at all times, a table for supporting an object in position for feeding of the skin of the object to the space between said roller and said pressure shoe, said table being adjustable on said frame, means for adjusting the portion of said table adjacent said reduced leading edge of the pressure shoe toward and away from said reduced leading edge, for accommodating different thicknesses of skin, and stripping means to strip the skin from said roller.

13. A skinning machine of the character disclosed comprising a frame, a serrated roller journaled thereon, a pressure shoe partially surrounding said roller for parting the skin from an object, a feed table for the object, said pressure shoe having a portion overhanging said roller on the side thereof adjacent said table, said table having one edge disposed adjacent said roller and below said overhanging portion of said pressure shoe, said roller having peripheral grooves between the serrations thereof, and stripping means to strip from the roller, a skin removed from the object between the serrations of the roller and said shoe, said stripping means having one end removably and swingably secured on the frame and the other end received in said grooves and partially surrounding said roller, said other end of said stripping means being held in position by said roller.

14. A skinning machine comprising a frame, a roller journaled thereon, a shoe pivoted on said frame and movable to operative position with respect to said roller to form a skin pulling means therewith, said shoe partially surrounding said roller when in operative position, a table mounted on said frame adjacent said roller for supporting an object to be skinned, a skinning blade mounted on said shoe and movable therewith, said skinning blade being adapted for parting the skin from the object to be skinned, said skinning blade, when the shoe is in its operative position, being disposed and having a normal operating position above and in proximity to said table, means fixed with respect to said frame for limiting the extent of movement of said shoe to operative position and for thereby maintaining said skinning blade out of contact with said roller and said table, said table being adjustable to vary the space between said skinning blade when its normal operating position and said table, and manual means for moving said shoe into its operative position and thereby said skinning blade into its normal operating position.

15. A skinning machine comprising a frame, a roller journaled thereon, a shoe pivoted on said frame and movable to operative position with respect to said roller to form a skin pulling means therewith, said shoe partially surrounding said roller when in operative position, a table mounted on said frame adjacent said roller for supporting an object to be skinned, a skinning blade mounted on said shoe and movable therewith, said skinning blade being adapted for parting the skin from the object to be skinned, said skinning blade, when said shoe is in its operative position, being disposed and having normal operating position above and in proximity to said table, said table being adjustable to vary the space between said skinning blade when in its normal operating position and said table, manual means for moving said shoe into its operative position and thereby said skinning blade into its normal operating position, means for adjustably limiting the extent of movement of said shoe into said operative position, and means for absolutely limiting the extent of movement of said shoe into said operative position, said absolute limiting means maintaining said skinning blade out of contact with said roller and said table.

16. In a skinning machine, a frame, a pair of swingable members mounted on the frame, a toothed roller mounted on the frame generally between and substantially parallel to the pivot axes of said swingable members, said members being swingable toward said roller to operating positions and swingable away from said roller, the free edges of said swingable members when in operating positions being adjacent each other and adjacent said roller, one of said members having a concave portion which, when the member is in its operating position, is in a position in working engagement with and partially surrounding said toothed roller to form a skin pulling means therewith, the free edges of said members cooperating with said skin pulling means to skin an object, said members being adapted to swing clear of said roller for cleaning purposes.

17. In a skinning machine, a frame, a pair of swingable members mounted on horizontal axes on the frame and swingable into and out of operating positions, a toothed roller mounted on a horizontal axis on the frame generally between and substantially parallel to the axes of said swingable members, the free edges of one of said swingable members when in operating position being adjacent said roller, said one swingable member being adapted to support an object to be skinned when in operating position, the other of said swingable members having a concave portion disposed when the member is in its operating position, adjacent to and partially surrounding said roller on the upper surface thereof to form a skin pulling means therewith, the free edge of said other swingable member, when in operating position, overlying said roller and being disposed adjacent to and spaced above the free edge of said one swingable member, the free edges of said swingable members cooperating with said skin pulling means to skin an object, and providing a space therebetween for the passage of the skin when skinned from the object, said members being adapted to swing clear of said roller for cleaning purposes.

18. In a skinning machine, a frame, a toothed roller journalled thereon, a pressure shoe pivoted on the frame movable toward said roller to operative position and away from said roller, said pressure shoe having a concave portion surrounding a substantial portion of said roller when said pressure shoe is in operative position, said roller and pressure shoe together forming a skin pulling means, a skinning blade carried by one peripheral margin of said pressure shoe, *means for urging said pressure shoe and said roller toward each other and affording movement of said pressure shoe and roller apart from each other to automatically vary the space therebetween to accommodate varying thicknesses of skin during the skinning operation* means for adjustably limiting the extent of movement of said pressure shoe toward said roller, and means fixed with respect to said roller for absolutely limiting the extent of movement of said pressure shoe toward said roller.

19. In a skinning machine, a frame, a toothed roller mounted on the frame, a pressure shoe having a concave surface following the curvature of said roller, means on the frame for movably mounting said pressure shoe for movement toward said roller into operative position and away from said roller, said pressure shoe being pivotally mounted on an axis parallel with the axis of said roller, the axis of said pressure shoe being between the peripheral margins of said concave surface, said concave surface being in close proximity to said roller and surrounding a substantial portion thereof when said pressure shoe is in operative position, a skinning blade carried by said pressure shoe on one peripheral margin of said concave surface and facing in the direction counter to the rotation of said roller, said roller and concave surface intercooperating to form a skin pulling means and forming the sole skin pulling means, said pressure shoe being rockable on its axis when in operative position in such a way that either peripheral margin of said concave surface can recede slightly from said roller when the other peripheral margin is closely adjacent the roller, said pressure shoe in all positions of rocking when in operative position being so positioned that said concave surface throughout its peripheral extent is in close proximity to said roller and thereby is effective throughout its peripheral extent in conjunction with said roller for gripping and pulling skin, said skinning blade being disposed closely adjacent said roller when said pressure shoe is in operative position and thereby being closely adjacent the region of close proximity between said roller and pressure shoe, and means operable on actuation thereof for yieldingly biasing said pressure shoe into operative position.

*20. In a machine for removing skin from meat pieces, a frame, a rotatable roller mounted on the frame, a pressure shoe having a concave surface, said concave surface being in close proximity to said roller and surrounding a substantial portion thereof when said pressure shoe is in operative position, said pressure shoe having a reduced leading edge on said concave surface extending in the direction counter to the rotation of said roller for severing the skin from the remaining body portion of the meat piece, said reduced leading edge being disposed closely adjacent said roller, when said pressure shoe is in operative position, and thereby being closely adjacent the region of close proximity between said roller and pressure shoe, said roller having a skin gripping surface thereon cooperating with said concave surface to form the sole skin pulling means, said pressure shoe, when in operative position, being so positioned that said concave surface is in such close proximity to said roller as to be thereby effective in conjunction with said roller for firmly gripping and positively pulling and feeding the skin for effecting severance of the skin from the meat piece and permitting the remaining body portion of said meat piece to move freely for accommodating the skinning action.*

*21. A machine for removing skin from an object comprising a frame, a driven rotatable roller journalled in said frame, a pressure shoe mounted on said frame, said pressure shoe having a reduced leading edge adjacent the roller for parting the skin from said object, said pressure shoe having a concave portion surrounding a substantial portion of said roller and closely spaced therefrom when said pressure shoe is in the position it assumes during the skinning operation, said roller having a skin gripping surface thereon cooperating with said pressure shoe to pull said skin past said leading edge, and means for urging said pressure shoe and said roller toward each other and affording movement of said pressure shoe and roller apart from each other to automatically vary the space therebetween to accommodate varying thicknesses of skin during the removal of the skin from said object.*

*22. A machine for removing skin from an object comprising a frame, a driven rotatable roller journalled in said frame, a pressure shoe mounted on said frame, said pressure shoe having a reduced leading edge adjacent the roller for parting the skin from said object, said pressure shoe having a concave portion surrounding a substantial portion of said roller and closely spaced therefrom when said pressure shoe is in the position it assumes during the skinning operation, said roller having a skin gripping surface thereon cooperating with said pressure shoe to pull said skin past said leading edge, and means for urging said pressure shoe toward said roller and affording movement of said pressure shoe away from said roller to automatically vary the space therebetween to accommodate varying thicknesses of skin during the removal of the skin from said object.*

RAY T. TOWNSEND.

REFERENCES CITED

The following references are of record in the file of this patent or the original patent:

UNITED STATES PATENTS

| Number | Name | Date |
|---|---|---|
| 657,322 | Taliaferro | Sept. 4, 1900 |
| 1,143,135 | Rathbun | June 15, 1915 |
| 1,291,173 | Salmon | Jan. 14, 1919 |
| 1,350,096 | Fisher | Aug. 17, 1920 |
| 1,365,927 | Lindsey et al. | Jan. 18, 1921 |
| 1,370,634 | Dowson | Mar. 8, 1921 |
| 1,376,810 | Hieatzman | May 3, 1921 |
| 1,516,678 | Morrison | Nov. 25, 1924 |
| 1,703,217 | Watson | Feb. 26, 1929 |
| 1,878,457 | Berry | Sept. 20, 1932 |
| 1,979,464 | Gurney | Nov. 6, 1934 |
| 2,068,464 | Norman | Jan. 19, 1937 |
| 2,254,969 | Lindsey | Sept. 2, 1941 |

FOREIGN PATENTS

| Number | Country | Date |
|---|---|---|
| 619,131 | France | Dec. 27, 1926 |
| 14,677 | Great Britain | July 31, 1894 |